United States Patent [19]

Larsen

[11] Patent Number: 4,597,817

[45] Date of Patent: Jul. 1, 1986

[54] PROCESS FOR THE PREPARATION OF A WATER-IMPERVIOUS SURFACE COATING

[75] Inventor: Ebbe D. Larsen, Tåstrup, Denmark

[73] Assignee: Aktieselskabet Jens Villadsens Fabriker, Herlev, Denmark

[21] Appl. No.: 655,430

[22] Filed: Sep. 28, 1984

[30] Foreign Application Priority Data

Sep. 29, 1983 [DK] Denmark ............................ 4486/83

[51] Int. Cl.[4] .......................... B32B 31/00; E04B 2/00

[52] U.S. Cl. .................................... 156/280; 52/309.3; 52/746; 156/71; 156/307.5; 156/310; 156/3.5; 156/332; 156/337; 524/60

[58] Field of Search ................. 156/71, 315, 280, 332, 156/310, 337, 307.5; 52/309.3, 746; 524/60

[56] References Cited

U.S. PATENT DOCUMENTS

| | | | |
|---|---|---|---|
| 2,503,246 | 4/1950 | Craig | 156/71 |
| 2,695,257 | 11/1954 | Castellani | 156/71 |
| 3,044,919 | 7/1962 | Stoneburner | 156/71 |

FOREIGN PATENT DOCUMENTS

| | | | |
|---|---|---|---|
| 2014238 | 8/1972 | Fed. Rep. of Germany | 156/337 |
| 840776 | 7/1960 | United Kingdom | 524/60 |
| 274289 | 6/1970 | U.S.S.R. | 524/60 |

*Primary Examiner*—John J. Gallagher

*Attorney, Agent, or Firm*—Watson, Cole, Grindle & Watson

[57] ABSTRACT

A process for the preparation of a water-impervious surface coating on a substrate comprising applying to the substrate a layer of an aqueous bitumen emulsion containing, based on dry matter, 5–55% by weight of an acrylic prepolymer, 1–15% by weight of an air-drying alkyd resin, 40–80% by weight of bitumen, and optionally up to 5% by weight of additives, applying to this layer a glass fibre layer, and subsequently applying to the glass fibre layer at least one layer of water-based paint.

A considerable saving in labor and time is obtained by the process and the coating obtained has an increased water vapor diffusion resistance.

11 Claims, No Drawings

PROCESS FOR THE PREPARATION OF A WATER-IMPERVIOUS SURFACE COATINGBACKGROUND OF THE INVENTION

This invention relates to a process for the preparation of a water-impervious surface coating on a substrate, the process comprising the steps of priming the substrate with an aqueous bituminous material, applying a glass fibre layer on the primed substrate, and applying to the glass fibre layer thus applied at least one layer of a paint comprising an aqueous dispersion of at least one film-forming material.

More particularly, the invention relates to a process for the preparation of a moisture-resistant surface coating on walls in wet rooms including walls made from water-sensitive materials, such as gypsum plaster and wood chip boards.

A prior art process for the preparation of such a water-impervious surface coating on walls in wet rooms comprises the steps of filling and stopping the walls to smoothen the surface and subsequently priming the surface with an aqueous caoutchouc bitumen emulsion. Subsequently a layer of a glue is applied to the primed surface and a glass fibre fabric is applied on top of the glue layer. Following the application of a glass fibre fabric, a water-resistant filler serving to smoothen the surface of the glass fibre fabric may be applied to the surface of the glass fibre fabric, and finally the coating thus prepared is painted with an aqueous dispersion of a film-forming material.

A surface coating obtained by utilizing a primer consisting of an aqueous caoutchouc bitumen emulsion provides an acceptable water-imperviousness and mechanical strength but an unacceptable water vapour diffusion resistance.

Another drawback of such a surface coating is that its preparation is highly time and labour consuming.

SUMMARY OF THE INVENTION

The object of the invention is to provide a surface coating of the above described type which does not suffer from the above mentioned drawbacks.

This object is achieved with the process of the invention, which comprises applying to the substrate a layer of an aqueous bitumen emulsion containing, based on dry matter, 5–55% by weight of an acryl prepolymer, 1–15% by weight of an air-drying alkyd resin and 40–80% by weight of bitumen and 0–5% by weight of additives and, when the layer thus applied has been at least partially dried out, applying a glass fibre layer directly onto the bituminous layer.

The invention is based on the surprising discovery that an aqueous bitumen emulsion having the above-mentioned composition performs the dual function of being a primer and a binder for the glass fibre layer.

Thus, it appears that the alkyd resin following the evaporation of water provides a sufficient initial tack to allow the glass fiber layer to be applied to the bituminous layer even when the alkyd resin is used in relatively small concentrations, whereas the acrylic prepolymer and the bitumen form a composition which imparts to the final coating a high water-imperviousness and resistance to water vapour diffusion.

Thus, compared with the above-mentioned well known four step process, the process of the invention comprises three steps only. Consequently, the process of the invention is less labour and time consuming than the above-mentioned well known process. Additionally, the surface coating obtained by the process of the invention exhibits a significantly increased resistance to water vapour diffusion than the prior art surface coatings. This will appear from the following table which sets forth water-imperviousness and water vapour diffusion resistance data obtained in tests in which a surface coating prepared by the process of the invention was compared with a surface coating prepared in a conventional manner.

| | Amount $kg/m^2$ | Water-perviousness, kg of absorbed water per $m^2$ | Water vapour diffusion resistance, $GPa \cdot s \cdot m^2 \cdot kg^{-1}$ |
|---|---|---|---|
| 1. Well known surface coating | | | |
| (a) Application of layer of aqueous caoutchouc bitumen emulsion primer | 0.25 | | |
| (b) Application of glue for glass fibre fabric | | | |
| (c) Application of the glass fibre fabric | 0.10 | 0.18 | 2–3 |
| (d) Application of a filler composition | 0.40 | | |
| (e) Painting with acryl paint (twice) | 0.30 | | |
| 2. Surface coating according to the inventor. | | | |
| (a) Application of a water-based combined primer and binder* | 0.25 | | |
| (b) Application of glass fibre fabric | 0.10 | 0.02 | 57 |
| (c) Priming of glass fibre fabric | 0.35 | | |
| (d) Application of acryl paint | 0.10 | | |
| Officially required water-absorption and steam diffusion resistance | | ≦0.20 | ≧5 |

*The combined primer and binder had the following composition:

| | | |
|---|---|---|
| Acrylic prepolymer | 25% | by weight |
| Alkyd resin | 3% | by weight |
| Distilled bitumen | 70% | by weight |
| Additives | 2% | by weight |
| Total | 100% | by weight. |

As will appear from the above table, the water-imperviousness of the prior art surface coating is just acceptable, whereas the water-imperviousness of the coating of the invention is far higher than officially required.

As far as the water vapour diffusion resistance is concerned, it appears from the table that the surface coating according to the invention fulfils the official requirements, whereas this is not the case as far as the prior art surface coating is concerned.

The acrylic prepolymers contained in the aqueous bitumen emulsions are commercially available in the form of aqueous dispersions. An example of such a commercially available dispersion is a product sold under the trade name "Ucefix" by UCB, Belgium.

The acrylic prepolymers used are preferably of a type which cures due to the formation of cross-linkages formed by condensation between the methylol and carboxylic acid groups. Particularly suitable acrylic prepolymers are those which cure at room temperature within a period of from 14 to 60 days. The curing time of these acrylic prepolymers may be reduced, if desired, by adding to the bitumen emulsion catalysts, such as metal soaps of 2-ethylhexanoic acid.

The air-drying alkyl resins are preferably of a type which has a relatively high content of alkyl chains derived from fatty acids, and particularly alkyl resins having a content of fatty acid alkyl chains of 40-50%. An example of a commercially available air-drying alkyd resin in "Uradil" ® sold by Scado B.V., Holland. If it is desired to exactly adjust the period within which the glass fibre layer can be applied to the layer of combined primer and binder, a siccative is preferably added to the bitumen emulsion in an amount of from 0.01 to 0.1%. Examples of suitable siccatives are cobalt naphthenate and metal salts of 2-ethylhexanoic acid. Such siccatives promote the cross-linking of both the acrylic prepolymers and alkyd resins and thus impart to the primer a desired elasticity and solidity which follow the initial plasticity of the bituminous layer.

The water content of the aqueous bitumen emulsion is preferably between 35 and 60% by weight. If the water content is less than 35%, problems tend to arise in the application of the emulsion, and when the water concentration is higher than 60%, too long a time has to elapse before the glass fibre layer can be applied.

The bitumen used is preferably distilled bitumen having a melting point (determined by the ball and ring method) of 42°-45° C.

Examples of additional additives which may be incorporated into the bitumen emulsion are foam depressors, thickening agents, dispersants and stabilizers.

The aqueous bitumen emulsion may be applied to the substrate which optionally has been treated with a filler using a brush or a paint roller but may also be applied by spraying. The emulsion is preferably used in an amount of 0.2-0.3 kg/m$^2$, and more particularly in an amount of about 0.25 kg/m$^2$.

The film formed as a result of the evaporation of water is sticky in itself but the tack is increased when a pressure is exerted thereon. Therefore, the glass fibre layer is preferably pressed against the film when it is applied thereon.

The application of the glass fibre layer can ordinarily be effected from the time at which the water has been substantially evaporated from the bitumen emulsion primer, and depending on the curing rates of the acrylic prepolymer and the air-drying alkyd resin and the additives optionally used, until several hours thereafter.

Thus, the application of the bitumen emulsion and the glass fibre layer can be planned in a manner such that the operations are effected under optimum conditions.

In order to facilitate the handling of the glass fibre layer it is preferably treated with a fixative which fixes the glass fibres or the glass fibre threads relatively to one another. In order to increase the adherence of the glass fibre layer to the substrate, the layer of glass fibres is preferably treated with a fixative which is compatible to the combined primer and binder. Thus, it is preferably to use a glass fibre fabric which has been fixed with an acrylic polymer.

The glass fibre layer is preferably a glass fibre fabric and particularly a fabric having a weight of about 0.1 kg/m$^2$.

By suitably adjusting the curing rate of the combined primer and binder and consequently also its stickiness, it is possible to correct errors, if any, made during the application, e.g., by adjusting the edge of the glass fibre fabric and smoothing out creases after the application to the substrate.

At least one layer of a water-based paint should be applied to the glass fibre layer thus obtained. Depending on the surface structure of the glass fibre layer, it may be desirable to prime the glass fibre layer before the paint is applied.

When the paint has been applied, a suitable time should be allowed to elapse in order to allow an after-curing. During such an after-curing the cohesion, water-resistance and wet strength of the coating increase significantly and at the same time the strength of the bond between the substrate and the glass fibre layer also increases.

By using a paint having a relatively high content of pigments and fillers, e.g., in an amount of 37-48% on dry basis, the priming and the final painting can be effected with paints of essentially the same compositions. In that case the paint is preferably one which on dry basis consists of 50-60% by weight of acrylic resin, 37-48% by weight of pigments and fillers and 2-3% by weight of additives.

By using a water-based plastic paint which on dry basis consists of about 55% by weight of acrylic resin, about 42% by weight of pigments and fillers and about 3% by weight of additives, the amount used for the first application is for example 0.30-0.35 kg/m$^2$ and 0.08-0.10 kg/m$^2$ for the second application.

At a temperature of about 20° C. and a relative humdity of about 50%, the second application may normally be effected about 2 hours after the first application. The acrylic resin, e.g. of the methylbutyl acrylate type, used in the paint provides a particularly good cohesion between the paint layer or layers and the glass fibre layer in cases where the glass fibre layer has been fixed with an acrylic polymer.

I claim:

1. A process for the preparation of a strong and water-impervious surface coating on an indoor substrate, said process comprising the steps of (a) applying to the substrate a layer of an aqueous bitumen emulsion containing, based on dry matter, 5-55% by weight of an acrylic prepolymer, 1-15% by weight of an air-drying alkyd resin and 40-80% by weight by bitumen and 0-5% by weight of additives, (b) applying a glass fibre layer directly onto said bituminous layer after said bituminous layer has at least partially dried out, and (c) applying to the glass fibre layer applied in step (b) at least one layer of a paint comprising an aqueous, non-bituminous dispersion of at least one film-forming material.

2. A process according to claim 1, wherein the aqueous bitumen emulsion applied in step (a) contains 5-30% by weight of acrylic prepolymer, 1-15% by weight of air-drying alkyd resin, 40-80% by weight of bitumen and 0-5% by weight of additives.

3. A process according to claim 1, wherein the aqueous bitumen emulsion applied in step (a) contains an acrylic prepolymer which cures as a result of formation of cross-linkages between methylol and carboxylic acid groups.

4. A process according to claim 3, wherein the aqueous bitumen emulsion applied in step (a) contains a curing catalyst for the acrylic prepolymer.

5. A process according to claim 1, wherein the aqueous bitumen emulsion applied in step (a) comprises an alkyd resin containing 40-50% alkyl chains derived from a fatty acid.

6. A process according to claim 1, wherein the aqueous bitumen emulsion applied in step (a) contains a siccative in an amount of from 0.01 to 0.1% by weight.

7. A process according to claim 1, wherein the aqueous bitumen emulsion applied in step (a) contains from 35 to 60% by weight of water.

8. A process according to claim 7, wherein the aqueous bitumen emulsion is applied to the substrate in step (a) in an amount of 0.20–0.30 $kg/m^2$.

9. A process according to claim 1, wherein the glass fibre layer applied in step (b) has been treated with a fixative compatible with the acrylic prepolymer.

10. A process according to claim 9, wherein the water-based paint used in step (c) contains a binder compatible with the fixative.

11. A process according to claim 1, wherein prior to step (a) the indoor substrate is treated with a filler.

* * * * *